WITTNESSES:

E. A. McCloskey

C. F. Renz

INVENTORS
George A. Kuntz, Andrew P. Kruper,
William L. Roberts and Charles H. Jones.
BY
F. E. Browder
ATTORNEY June 24, 1958 A. P. KRUPER ET AL 2,840,738

COLOR TELEVISION TUBE

Filed May 5, 1954 3 Sheets-Sheet 2

United States Patent Office 2,840,738

Patented June 24, 1958

2,840,738

COLOR TELEVISION TUBE

Andrew P. Kruper, Pittsburgh, William L. Roberts, Turtle Creek, George A. Kuntz, East McKeesport, and Charles H. Jones, Pittsburgh, Pa., assignors to Westinghouse Electric Corporation, East Pittsburgh, Pa., a corporation of Pennsylvania Application May 5, 1954, Serial No. 427,814

2 Claims. (Cl. 313—78)

This invention relates to cathode ray tubes and more particularly to the presentation of televised images in natural color.

It is an object of this invention to provide an improved cathode ray tube capable of the reproduction of televised images in natural color.

It is another object to provide an improved color television tube of the type utilizing a color control deflection grid near the image screen so as to reduce the deflection voltage required.

It is another object to provide an improved color television tube of the type utilizing a color control deflection grid near the image screen by reducing the capacitance between the elements of the color control deflection grid.

It is another object to provide an improved color television tube of the type utilizing a color control deflection grid near the image screen to provide for the presentation of sequential or simultaneous color images.

It is another object to provide an improved color television tube of the type utilizing a color control deflection grid near the image screen in which the deflection is accomplished by the velocity modulation of the electron stream.

These and other objects are effected by our invention as will be apparent from the following description taken in accordance with the accompanying drawings throughout which like reference characters indicate like parts, and in which.

Figures 1, 2:
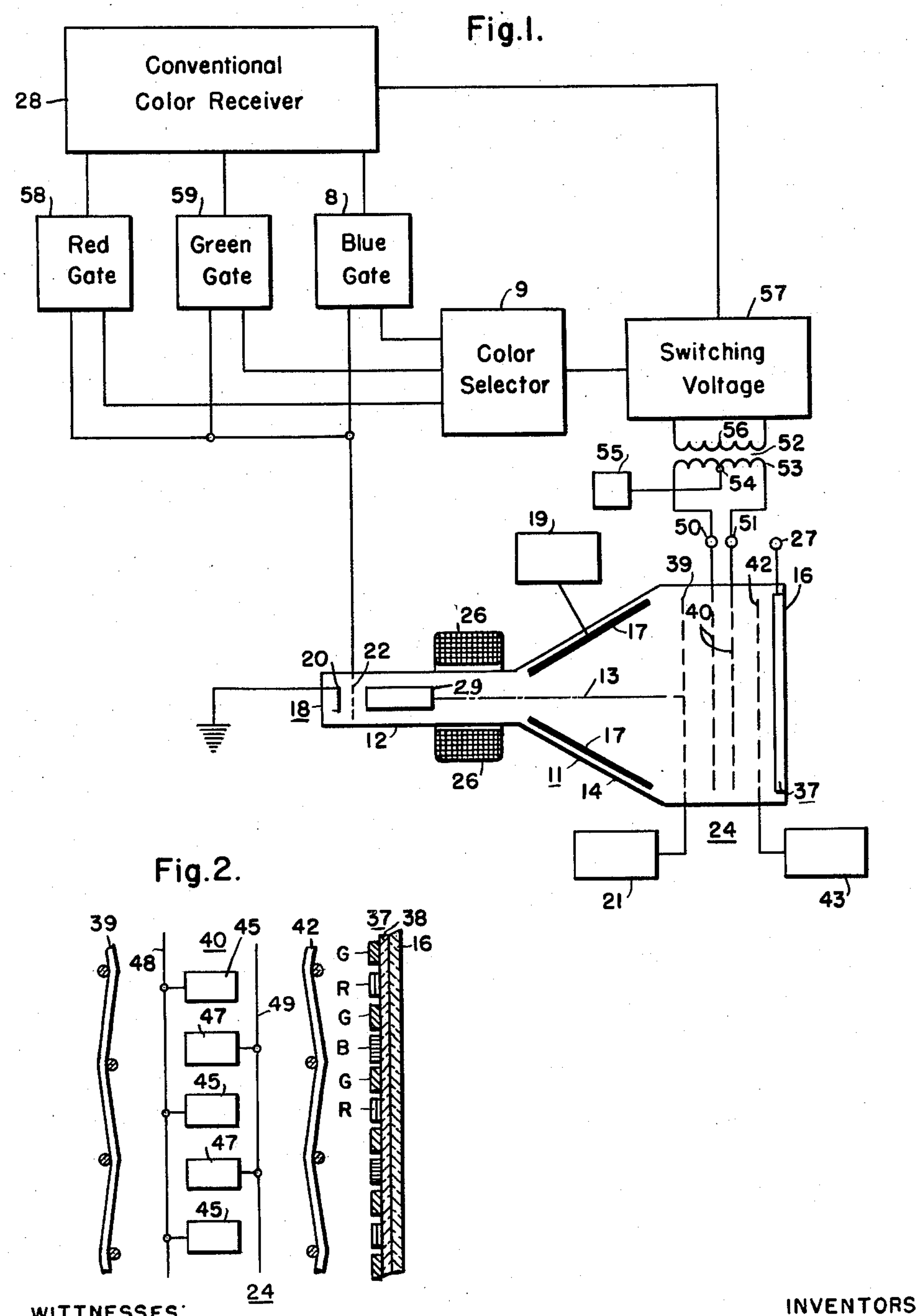
Figure 1 shows by block diagram one embodiment of our invention.
Fig. 2 shows a schematic view of a part of the control assembly and image screen of the tube shown in Fig. 1.

Referring in detail to Figs. 1 and 2, a picture tube is shown and includes an envelope 11 having a neck portion 12, a frustum surface portion 14 and a viewing window 16. An electron gun 18 is positioned within the neck portion 12 of the evacuated envelope 11 for projection of an electron beam 13. The electron gun 18 may be of any suitable design and for purposes of simplification of the description, only the cathode 20, control grid 22 and anode 29 of the electron gun 18 are shown.

A suitable electrostatic or electromagnetic deflection arrangement such as the deflection coils 26 are provided around the neck portion 12 of the envelope 11 for the deflection of the electron beam 13, in both the vertical and horizontal directions. A deflection signal derived from a suitable receiver 28 is supplied to the deflection coils 26 to provide the necessary horizontal and vertical scanning control to the electron beam 13 so as to cause the electron beam 13 to scan a raster pattern on the back of a control assembly 24 which is positioned near the viewing window 16.

A conductive coating 17 is provided on a portion of the interior surface of the frustum portion 14 of the envelope 11 with a voltage source 19, provided for the application of a suitable voltage. The purpose of the conductive coating 17 within the interior of the envelope 11 is for electrostatic focussing of the electron beam 13.

An output screen 37 is positioned near to or deposited on the interior surface of the viewing window 16. The output screen 37 is comprised of a plurality of groups of elemental areas of phosphor coatings having a conductive coating with an external terminal 27 provided. In the specific example shown, the elemental phosphor areas are in the form of strips R, G and B which are horizontal in orientation and extend substantially across the entire surface of the viewing window 16. In the embodiment shown in Figs. 1 and 2 the phosphor strip R is of a phosphor material such as zinc phosphate activated by manganese capable of emission of light of a red color, the strip G is of phosphor material such as zinc silicate activated by manganese capable of emission of light of a green color, and the strip B is of a phosphor material such as zinc sulphide activated by silver capable of emission of light of a blue color upon electron bombardment. The strips R, G and B are arranged so that every other strip is G, while the R and B strips are positioned so as to alternate between the G strips. The strips of phosphor material R, G and B of the output screen 37 may be deposited on the viewing window 16 in any suitable manner.

An electron permeable material such as a thin aluminum coating may be deposited on the rear side of the phosphor coating facing the electron gun 18 to provide a high voltage electrode for the image screen 37 and also to increase the light output from the image screen 37. In Figs. 1 and 2, a transparent conductive coating 38 such as Nesa may be utilized on the front side of the phosphor coating to provide a suitable voltage electrode rather than using aluminum backing. The use of a supporting structure such as glass with a conductive coating such as Nesa also permits moving the image screen 37 from the viewing plate 16.

Between the electron gun 18 and the image screen 37 there is provided the control assembly 24. The control assembly 24 is comprised of at least three electrodes 39, 40 and 42. The electrodes 39, 40 and 42 are of substantially the same area as the image screen 37 and are substantially parallel to each other.

The electrode 39 of the control assembly 24 nearest to the electron gun 18 is of a thin foraminous conducting material which may be in the form of a mesh or a perforated sheet of a conductive material. A suitable voltage source 21 is provided exterior of the envelope 11 for the electrode 39. The electrode 39 in conjunction with the conductive coating 17 form an electrostatic lens and cause the electron beam 13 to approach the electrode 40 which is positioned between the electrode 39 and the image screen 37 normal or perpendicular thereto. It may also be desirable to make the elements of the control assembly 24 and the screen 37 curved so as to reduce the amount of focussing required. For example, by making assemblies 24 and 37 spherical with a radius at the deflection center, no focussing is required and elements 17 and 39 may be at the same potential.

The color control deflection electrode 40 in the specific example shown in Figs. 1 and 2 is comprised of a plurality of horizontal parallel conductive elements uniformly spaced. The conductive elements numbered 45 which alternate with the conductive elements 47 are positioned so as to be in electron registry with the phosphor strip R while the conductive elements 47 are positioned so that they are in electron registry with the phosphor strips B. The conductive elements 45 are connected together by means of a conductor 48 which is connected to a terminal 50 exterior to the envelope 11. The conductive elements 47 are connected by a conductor 49 which is connected to an exterior terminal 51 on the envelope 11.

The electrode 42 which may be in the form of a mesh structure or a sheet of perforated conductive material and of similar structure to the electrode 39, is positioned between the color control deflection electrode 40 and the image screen 37. The purpose of the electrode 42 is to form an electrostatic field-free region between the color control deflection grid and the image screen 37. This is accomplished by the application of a suitable voltage from a source 43 provided on the exterior of the envelope 11.

The terminals 50 and 51 are connected to the terminals of the secondary winding 53 of a transformer 52. A center tap 54 is provided on the secondary winding 53 and a suitable voltage from the source 55 is connected to the center tap 54.

The primary winding 56 of the transformer 52 is connected to a suitable switching voltage source 57. The frequency of the switching voltage is dependent on whether the presentation is desired in dot, line or field sequential. The switching voltage may be synchronized by a signal from a suitable receiver such as described in B. D. Loughlin—Processing of the NTS color system for one-gun sequential color displays—Proc. IRE, vol. 42, No. 1, pages 299–308, and J. D. Gow and R. Dorr—Compatible color picture presentation with the single gun tricolor chromation—Proc. IRE, vol. 42, No. 1, pages 308–315.

The color or video signals derived from the receiver 28 are fed to the grid 22 of the electron gun 18 through gating tubes 58, 59 and 8. The gating tubes 58, 59 and 8 are provided respectively for the red video signal, green video signal and blue video signal. The gating pulses fed to the gates 58, 59 and 8 are obtained from a color selector 61 such as described in an article entitled "Compatible color picture presentation with the single gun tricolor chromation" by J. D. Gow and R. Dorr in January 1952 issue of Proc. of IRE, page 308. The gating pulses obtained from the color selector 9 are synchronized to the color switching signals applied to color control grid 40.

In the operation of the device shown in Figs. 1 and 2, the electron gun 18 generates an electron beam 13 within the envelope 11 and is directed toward the control assembly 24. The electron beam 13 is deflected horizontally and vertically to scan a raster pattern on the rear of the control assembly 24 by means of the deflection coils 26 positioned around the neck portion 12 of the envelope 11.

A direct current voltage from the source 19 is applied to the conductive coating 17 on a portion of the interior surface of the frustum section 14 of the envelope 11. This potential will be of a lower voltage than the direct current potential applied to the electrode 39 of the control assembly 24 by the voltage source 21 when focussing is required. By the proper selection of voltage ratio between the conductive coating 17 and the electrode 39, an electrostatic focussing action is applied to the electron beam 13 so as to cause the electron beam 13 to approach the color control deflection electrode 40 of the control assembly 24 substantially normal to its surface at all points thereon. The shape of the frustum portion 14 of the envelope 11 is important in achieving proper lens action since the conductive coating 17 is applied thereto and it may be desirable to utilize a properly shaped electrode member within the frustum region 14 of the envelope 11 rather than placing the conductive coating 17 on the surface of the frustum region 14.

In a typical example the electrode 39 has a direct current potential of about 4500 volts positive with respect to the potential of the cathode 20 of the electron gun 18 while the conductive coating 17 is held at approximately 900 volts positive with respect to the cathode 20. It is necessary for the proper operation of the color control deflection electrode 40 that all the electrons within the electron beam 13 approach substantially normal to the surface thereof.

The use of the electrode 39 between the color control deflection grid 40 and the electron gun 18 also permits the operation of the color control deflection electrode 40 at a small positive voltage of about 20 to 200 volts with respect to the cathode 20. The low positive potential applied to the color control electrode 40 by the voltage source 55 reduces the velocity of the electrons within the electron beam 13 as they pass between the conductive elements 45 and 47 of the color control deflection electrode 40. The reduction in velocity of the electrons as they pass through the electrode 40 allows a substantial reduction in the deflection voltage and power required to deflect the electron beam 13. The small positive voltage applied to the color control electrode 40 is applied to both terminals so that the entire grid structure is held at a small positive voltage with respect to the cathode 20.

The receiver 28 converts the signal received into color signals. The color signals red, green and blue representative of the primary colors are connected respectively through the gating tubes 58, 59 and 8 to the control grid 22. The gating pulses obtained from the color selector 9 are synchronized to the switching voltage obtained from the source 57 by a synchronizing signal. The switching voltage may or may not be synchronized with the 3.58 mc. reference signal from the receiver 28. It may also be synchronized with the line of field frequency. The switching voltage source 57 may simply be an oscillator running at about 10 mc. and not receiving any synchronizing signal from the receiver 28.

If it is assumed that switching is accomplished at the line frequency (15,750 kc.) of the electron beam scan, then during one line scan the conductors 45 and 47 of the color control deflection electrode 40 will have the same potential and the electron beam 13 will pass through the spaces between the conductive elements 45 and 47 and strike the phosphor strips G and light will be emitted from the image screen 37 representative of the green image for one line scan. The conductive elements 45 and 47 will prevent the electrons within the electron beam 13 from striking the phosphor strips R and B since they will operate essentially like a masking electrode. The color selector 9 will open the gate 59 allowing the green video signal to be applied to the control grid 22 during this line scan.

In the next line scan of the television raster, the potential from the source 57 are placed on the conductors 45 and 47 such that one conductor is positive with respect to the other conductor. The voltage difference applied between the conductive elements by the voltage source 57 will be about 50 volts. The electrostatic field set up between the conductive elements by the voltage source 57 will be about 50 volts. The electrostatic field set up between the conductive elements 45 and 47 of the color control deflection grid 40 if the element 45 is positive with respect to the element 47 causes the electron beam to be deflected so that the electron beam will strike only the phosphor strips R. This potential difference between the conductive elements is maintained during the entire line scan. The gate 58 will be open during this line scan allowing the red video signal to be applied to the control grid 22.

In the next line scan a difference of potential is applied from the source 57 between the elements 45 and 47 such that the conductive element 47 is positive with respect to the conductive element 45. The voltage difference again will be of the order of 50 volts. The electrostatic field set up in this case will deflect the electron beam 13 so that electrons will strike only the phosphor strips B. Only gate 8 will be open in this line scan permitting the blue video signal to be applied to the control grid 22. By this operation an image will be reproduced upon the image screen 37 by reproducing the received image by line sequential means. By varying the frequency of the synchronizing signal, field or dot sequential operation may be obtained.

The electrode 42 of the control assembly 24 may be positioned between the image screen 37 and the color control deflection electrode 40, and is connected to the voltage source 43 of a slightly higher positive voltage than the voltage applied to the color control electrode 40 by the source 55.

The electrodes 39 and 42 which may be similar in construction are of a fine mesh high transmission screen of conductive material and having a transmission of about 85%. The electrodes 39 and 42 may be also constructed of fine wires parallel to each other and orientated at right angles with respect to the conductive elements within the color control grid 40. In a typical example the diameter of the wires would be about three mils while the spacing between wires would be of the order of 30 mils. The grids 39 and/or 42 may also consist of conductive wires parallel to and in registration with the conductor of the control assembly 40.

The voltage on the image screen 37 is of the order of 15 to 18 kilovolts and functions on the electrons leaving the color control deflection grid 40 to accelerate and thereby increase the overall brightness of the image reproduced on the screen 37. The post acceleration of the image screen 37 has some undesirable effect also in that it tends to deflect the electron beam 13 in toward the image screen 37. In order to obtain the proper amount of deflection of the electron beam to selectively obtain the desired colors, it is required that an increased amount of deflection voltage or power must be applied to the color control deflection grid 40. The addition of the electrode 42 provides a relatively field-free region for the electrons within the electron beam 13 to traverse after they are deflected by the color control electrode 40 and before they are post accelerated toward the image screen 37 by the voltage applied to the screen 37.

The addition of the electrode 39 between the color control deflection grid 40 and the electron gun 18 reduces the power required to deflect the electrons the proper amount, while the electrode 42 inserted between the image screen and the color control electrode 40 will also reduce the voltage and power required.

Figure 3:
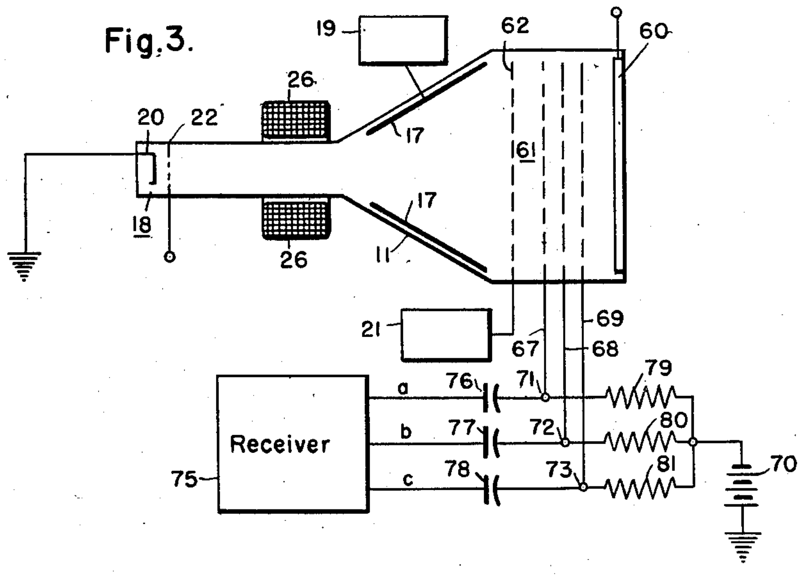
Fig. 3 shows by block diagram another embodiment of our invention.
Figure 4:
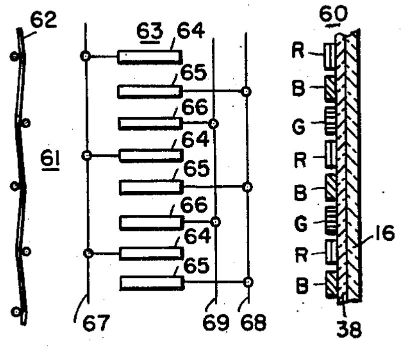
Fig. 4 shows a schematic view of a portion of the control assembly and image screen of the tube shown in Fig. 3.

Referring in detail to Figs. 3, 4 and 5 there is shown another embodiment of our invention in which only the construction and connections of the control assembly and the image screen are modified from that as shown in Figs. 1 and 2. The image screen 60 in Figs. 3, 4 and 5 is modified from the image screen 16 only in the arrangement of the phosphor strips R, G and B in that the phosphor strips are now arranged so as to consist of alternating strips R, B and G.

The control assembly 61 is comprised of an electrode 62 which is of similar structure and operation to that of the electrode 39 in Figs. 1 and 2. The color control grid 63 is comprised of a plurality of elements 64, 65 and 66. The elements 64, 65 and 66 are similar to the previously described elements 45 and 47. The elements 64, 65 and 66 are positioned so that the elements 64 are in front of the phosphor strips R, the elements 65 in front of the strips B and the elements 66 in front of the strips G. The elements 64 are connected together by the conductive lead 67 and provided with a terminal 71 external to the envelope 11. The elements 65 are connected together by a conductive lead 68 with a terminal 72 provided external to the envelope 11. The elements 66 are also connected together by a conductive lead 69 with a terminal 73 provided external to the envelope 11.

A suitable receiver 75 such as described in M. H. Kronenberg and E. S. White—Design Techniques for Color Television Receivers Electronics—February 1954, vol. 27, No. 2, pages 136–143 provides three separate voltages *a*, *b*, and *c*. The voltages *a*, *b* and *c* are connected respectively to the terminals 71, 72 and 73 by suitable blocking condensers 76, 77 and 78.

A negative biasing voltage from a suitable source 70 is connected to the terminals 71, 72 and 73 by the respective resistance elements 79, 80 and 81.

Figure 5A:
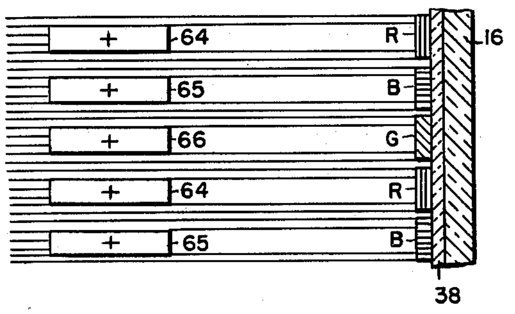
Figs. 5A, 5B, 5C and 5D are diagrammatic illustrations of a part of the control assembly and image screen of the tube shown in Fig. 3.
Figure 5B:
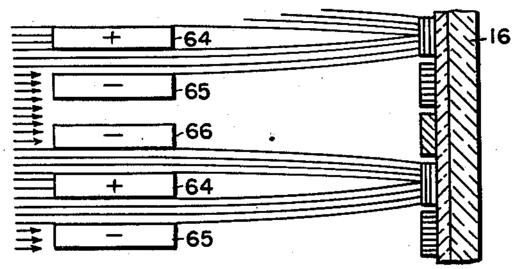

Referring in detail to Fig. 5A to explain the operation of the device shown in Figs. 3 and 4, all of the conductive elements 64, 65 and 66 of the color control grid 63 are of substantially the same positive voltage as obtained from the receiver 75 and the electrons will pass between the conductive elements 64, 65 and 66 and will not be deflected and will strike the phosphor strips R, B and G of different colors simultaneously, and of similar amounts so as to obtain a substantially white or gray picture. In Fig. 5B the conductive elements 65 and 66 positioned behind the phosphor strips B and G are made of substantially the same negative potential by the voltages *b* and *c* and the bias source 70 while the conductive element 64 behind the phosphor strips R is made positive by the voltage *a*. The electrons are permitted to pass on both sides of the conductive elements 64 having a positive potential and are deflected toward the phosphor strip R so that an image of red color is reproduced on the image screen 60.

Figure 5C:
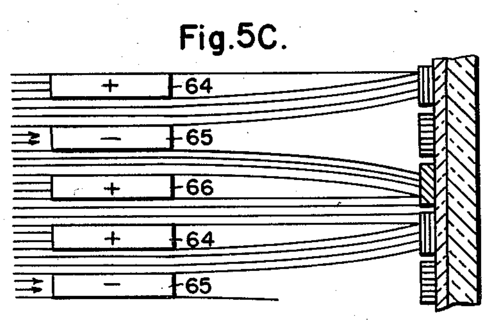

In Fig. 5C, the conductive elements 64 and 66 positioned behind the phosphor strips R and G are made positive while the conductive element 65 behind the phosphor strip B is made negative. In this case electrons are permitted to pass on both sides of the positively biased conductive elements 64 and 66 and are deflected onto the phosphor strips G and R so as to present a yellow color on the image screen.

Figure 5D:
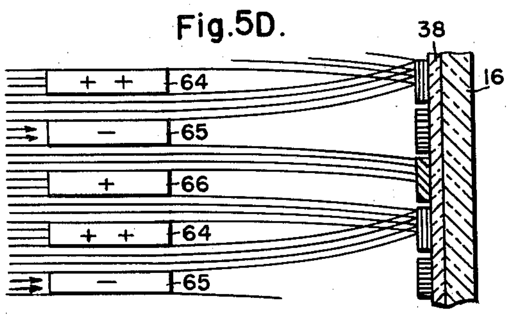

In Fig. 5D, the conductive element 65 behind the strip B is made negative, the conductive element 66 behind the strip G is made positive and the conductive element 64 behind the phosphor strip R is made more positive than the conductive element behind the phosphor strip G. In this case electrons are again permitted to pass on both sides of the positively biased conductive elements 64 and 66, so that substantially twice as many electrons will strike the phosphor strip R as will strike the phosphor strip G, while substantially no electrons will strike the phosphor strip B. In this manner an orange color would be obtained upon the image screen. If a desaturated orange were desired in this case, the conductive element 65 behind the phosphor strip B would be made more positive so that some electrons would strike the phosphor strip B. When blue, green or red are being presented on the image screen, electrons flow through ⅔ of the slits or holes between the conductive elements in the color control grid 63. When yellow magenta or cyan are used, then electrons flowing through all the holes are utilized. When white or gray colors are presented, all of the electrons are used except those that hit or are intercepted by the conductive elements of the color control grid or the insulating support structure thereof.

It is therefore seen from the above description and operation of the device that substantially all shades of colors may be obtained by the proper ratio of voltages *a*, *b* and *c* upon the conductive elements 64, 65 and 66 of the color control grid.

This tube may be also operated sequentially by applying the three color signals to the grid 22 at a dot, line or field sequential rate while applying a sinusoidal three phase voltage to the color control grid elements 67, 68 and 69. The rectangular wave shaped signals such as described in a copending application Serial No. 411,382, filed February 19, 1954, entitled Color Television Tube and assigned to the same assignee may also be utilized.

Figure 6:
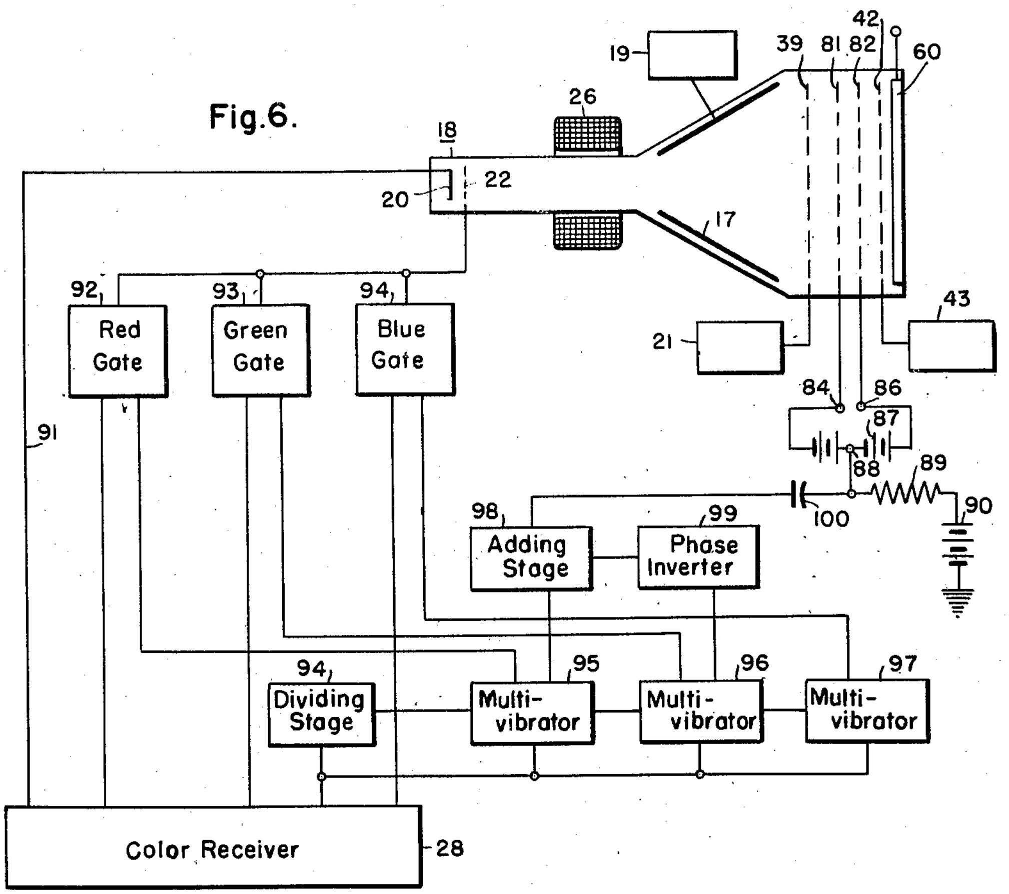
Fig. 6 shows by block diagram another embodiment of our invention.
Figure 7:
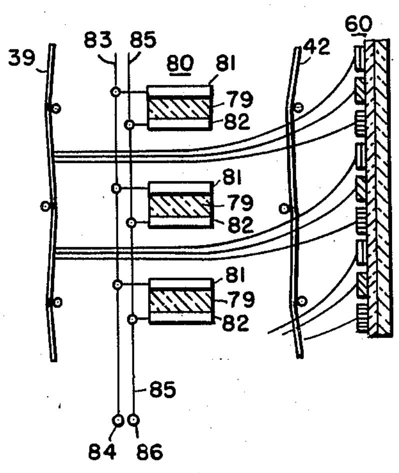
Fig. 7 shows a schematic view of a portion of the control assembly and image screen of the tube shown in Fig. 6.

Referring in detail to Figs. 6 and 7, there is shown another modification of the device shown in Figs. 1 and 2. The modification consists in modifying the structure of the color control electrode 40 and the image screen 16. The phosphor screen 60 is utilized in Figs. 6 and 7 as previously described with reference to Figs. 3 and 4.

The structure of the color control deflection electrode 80 consists of a plurality of pairs of plates or elements 81 and 82 in which one pair is provided for each group of phosphor strips R, B and G. An insulating material or electron opaque structure 79 is positioned between each pair of plates 81 and 82 so that electrons may pass only between adjoining pairs of plates 81 and 82. A conductor 83 connects all of the elements 81 in parallel and is brought outside of the envelope 11 to provide an external terminal 84. A conductor 85 is also provided for the elements 82 and connects the elements 82 in parallel and provides an external connection at a terminal 86.

The terminal 84 of the color control deflection electrode is connected to the negative terminal of a battery 87 while the terminal 86 is connected to the positive terminal of the battery 87. A center tap 88 is provided on the battery 87 and is connected through a resistor 89 to the positive terminal of a battery 90. The negative terminal of the battery is connected to ground.

The color receiver 28 provides a luminous or monochrome signal which is connected to the cathode 20 of the electron gun 18 by means of the conductor 91. The color difference signals, in this case represented by a red color difference signal, a green color difference signal and a blue color difference signal, are connected through respective gating devices 92, 93 and 94 to the control grid 22 of the electron gun 18. The line synchronizing signal which is derived from the receiver 28 is connected to a dividing stage 94 which divides the line sync pulse into trigger pulses so that a pulse is fed from the output of the dividing stage 94 at every third pulse of the line sync signal. Three multivibrator units 95, 96 and 97 are provided for the respective gating devices 92, 93 and 94 so as to open the gating devices 92, 93 and 94 at the proper time. The trigger pulses derived from the dividing stage 94 are connected to the multivibrator 95 so as to actuate the multivibrator. The multivibrator 95 is restored by the line sync signal which is connected directly to the multivibrator 95. The action of restoring the multivibrator 95 to normal operating condition in turn generates a pulse which activates the multivibrator 96 which opens the gate 93. The multivibrator 96 is restored to normal operation condition by the line sync signal which is also connected directly to the multivibrator 96. The multivibrator 96 when restored to normal by the line sync pulse in turn generates a pulse to the multivibrator 97 so as to actuate the multivibrator 97 and open the gate 94. The line sync signal which is also connected directly to the multivibrator 97 restores the multivibrator 97 to normal operating conditions and the cycle would repeat.

The output of the multivibrator 95 is connected to an adding stage 98 while the output of the multivibrator 96 is connected to the adding stage through a phase inverter 99. An output is derived from the adding stage which is a voltage having a stair step wave form such as described in an article entitled "4.5 degree reflection type color kinescope" by P. K. Weimer and N. Rynn in Proceedings of IRE, October 1951, page 1201, having three levels. The output from the adding stage 98 is connected through a condenser 100 to the center tap 88 of the battery 87.

In the operation of the device shown in Figs. 6 and 7, the color control deflection electrode 80 is held at a potential slightly positive with respect to the cathode 21 by means of the battery 90. A permanent voltage difference is also placed across each of the pairs of the plates 81 and 82 by the battery 87 so that the electron beam is deflected to only one of the phosphor strips R, G or B on the image screen 60. The switching of the device from the different phosphor strips R, G and B is accomplished by lowering or raising the potential on the entire color control grid 80 with respect to the cathode 20. It is also possible to swing the color grid 80 and the image screen 60 with respect to the cathode 20.

In this manner, we are effectively varying the velocity of the electron beam as it approaches the color deflection grid 80 after passing through the constant potential grid 39, and as a result, the electron beam will be deflected in proportion to the square of the velocity of the electron beam passing through the color control grid 80.

By the structure and device shown in Figs. 6 and 7, we have in effect obtained a velocity modulation device in which deflection is obtained by varying the voltage on the control grid with respect to the cathode 20 potential. By this type of operation, we are able to reduce the driving point capacitance of the deflection device utilized. Instead of driving the capacitance between each of the conductive elements or plates 81 and 82 of the color control grid 80, we are now driving the capacitance between the color control deflection electrode 80 and the constant potential electrode 39. This results in a considerable reduction in the deflection voltage and power required of the tube. The grid 42 may be used to further reduce deflection power.

The stair stage voltage which is applied to the color control electrode 80 is in phase with the gating so that when the electron beam is deflected onto the phosphor strip R, the red gate will be open, and when the electron beam is on the phosphor strip G, the green beam will be open, and when the electron beam is on the phosphor strip B, the blue gate will be open. The device shown in Figs. 6 and 7 may be operated at a dot, line or field rate.

While we have shown our invention in several forms, it will be obvious to those skilled in the art that it is not so limited, but is susceptible of various other changes and modifications without departing from the spirit and scope thereof.

We claim as our invention:

1. A color television tube comprising an image screen, said screen having a plurality of groups of phosphor strips thereon, each of said groups comprising a first phosphor strip capable of emission of light of a first selected component color, a second phosphor strip capable of a second selected component color, and a third phosphor strip capable of emission of light of a third selected component color, an electron gun comprising a cathode for generating and directing an electron beam towards said image screen, means for deflecting said electron beam vertically and horizontally to scan a raster pattern on said image screen, a color control electrode substantially parallel to and of similar area as said image screen positioned between said electron gun and said image screen, said color control electrode comprising a plurality of uniformly spaced conductive elements, said conductive elements parallel to said phosphor strips and spaced so that a conductive element is positioned in front of each of said phosphor strips, electrical conductive means for joining those conductive elements positioned in front of the same color emitting phosphor strips to form three insulated, interleaved grid structures, an electron transparent screen operating at a potential positive with respect to said cathode and positioned between said electron gun and said color control electrode, and means for varying the voltage applied to said grid structures of said color control electrode near the potential of said cathode to cause said electron beam to strike selected phosphor strips on said image screen.

2. A color television tube comprising an image screen having a plurality of groups of phosphor strips, each of said groups comprising a first phosphor strip capable of emission of light of a first selected color, a second phosphor strip capable of emission of light of a second selected color, and a third phosphor strip capable of emission of light of a third selected color, an electron gun comprised of a cathode for generating and directing an electron beam toward said image screen, a planar type color control structure comprised of a plurality of conductive elements parallel to said phosphor strips and uniformly spaced so that a conductive element is positioned substantially in front of the center of each of said phosphor strips, elecrical conductive means for joining those conductive elements positioned in front of similar color emitting phosphor strips to form three insulated interleaved grids, a conductive grid member positioned between said electron gun and said color control structure, said grid operating at a positive potential, and means for varying the voltage applied to said interleaved grids of said parallel type color control structure near the potential of said cathode to cause said electron beam to strike the desired strip on said image screen.

References Cited in the file of this patent

UNITED STATES PATENTS

| | | |
|---|---|---|
| Re. 23,672 | Okolicsangi | June 23, 1953 |
| 2,573,777 | Sziklai | Nov. 6, 1951 |
| 2,606,246 | Sziklai | Aug. 5, 1952 |
| 2,619,608 | Rajchman | Nov. 25, 1952 |
| 2,646,521 | Rajchman | July 21, 1953 |
| 2,723,361 | Beckers | Nov. 8, 1955 |
| 2,745,037 | Rynn | May 8, 1956 |
| 2,754,357 | Pensak | July 10, 1956 |
| 2,755,410 | Schlesinger | July 17, 1956 |
| 2,759,995 | Miller | Aug. 21, 1956 |

FOREIGN PATENTS

| | | |
|---|---|---|
| 582,892 | Great Britain | Dec. 2, 1946 |